(12) United States Patent
Chang

(10) Patent No.: US 8,467,008 B2
(45) Date of Patent: Jun. 18, 2013

(54) CLAMPING DEVICE, BACKLIGHT MODULE, AND DISPLAY APPARATUS

(75) Inventor: Chia-Chun Chang, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 884 days.

(21) Appl. No.: 12/551,508

(22) Filed: Aug. 31, 2009

(65) Prior Publication Data
US 2011/0007235 A1     Jan. 13, 2011

(30) Foreign Application Priority Data
Jul. 7, 2009 (TW) ................................ 98212330 U

(51) Int. Cl.
*G02F 1/1333* (2006.01)
(52) U.S. Cl.
USPC ............................................ 349/58; 349/65
(58) Field of Classification Search
USPC ................................................... 349/58–65
See application file for complete search history.

(56) References Cited

U.S. PATENT DOCUMENTS

| | | | |
|---|---|---|---|
| 5,978,060 A | 11/1999 | Nakawaki et al. | |
| 6,292,239 B1* | 9/2001 | Nagamura et al. | 349/58 |
| 6,747,713 B1* | 6/2004 | Sato | 349/58 |
| 7,209,195 B2* | 4/2007 | Lin | 349/58 |
| 2006/0119760 A1* | 6/2006 | Okuda | 349/58 |

FOREIGN PATENT DOCUMENTS

TW     200617498     6/2006

* cited by examiner

*Primary Examiner* — Edward Glick
*Assistant Examiner* — David Chung
(74) *Attorney, Agent, or Firm* — Jianq Chyun IP Office

(57) ABSTRACT

A clamping device including a back frame and a top cover is provided. The back frame includes a first body and a first sidewall, wherein the first sidewall is connected to the first body in a substantially vertical manner. The top cover includes a second body and a second sidewall, wherein the second sidewall is connected to the second body in a substantially vertical manner. When the top cover is assembled to the back frame, the second sidewall leans closely against the first sidewall, and the first body is opposite to the second body. The second body includes a main part and a concave part connecting together, wherein the distance from the concave part to the first body is shorter than the distance from the main part to the first body. Furthermore, a backlight module and a display apparatus that utilize the clamping device are also provided.

24 Claims, 8 Drawing Sheets

CLAMPING DEVICE, BACKLIGHT MODULE, AND DISPLAY APPARATUS

CROSS-REFERENCE TO RELATED APPLICATION

This application claims the priority benefit of Taiwan application serial no. 98212330, filed on Jul. 7, 2009. The entirety of the above-mentioned patent application is hereby incorporated by reference herein and made a part of specification.

BACKGROUND OF THE INVENTION

1. Field of Invention

The invention provides a clamping device, and a backlight module and a display apparatus utilizing the clamping device. More particularly, the invention provides a clamping device that makes assembly easier, and a backlight module and a display apparatus utilizing the clamping device.

2. Description of Related Art

Because the display medium, i.e. the liquid crystals, in liquid crystal display (LCD) panels do not illuminate, each LCD apparatus must include an additional light source. LCD apparatuses can be sorted by the types of the utilized light sources. Reflective LCD apparatuses, transmissive LCD apparatuses, and trans-flective LCD apparatuses are three popular types of LCD apparatuses. In either a transmissive LCD apparatus or a trans-flective LCD apparatus, a backlight module is used to provide the surface light source required by the LCD panel.

FIG. 1A is a top view diagram of a conventional LCD apparatus using a side-type backlight module. FIG. 1B is a schematic diagram showing the enlarged area A of FIG. 1A. FIG. 1C is a 3-dimensional diagram showing the cross-section along the A-A' direction of FIG. 1A. FIG. 1D is a top view diagram of the metal frame of the backlight module and the resin frame of the LCD apparatus of FIG. 1A. Refer to FIGS. 1A~1C first. The LCD apparatus 100 includes an LCD panel 110, a metal frame 120, a resin frame 130, a light source module 150, and a circuit board 140, wherein the light source module 150 is only shown in FIG. 1C. The circuit board 140 is electrically connected to the LCD panel 110 and is located on a side of the LCD panel 110. The circuit board 140 and the LCD panel 110 are interconnected but do not overlap. In other words, rather than being bent to the back of the LCD panel 110, the circuit board 140 is arranged side-by-side with the LCD panel 110. Furthermore, the metal frame 120 and the resin frame 130 clamps the light source module 150 and the LCD panel 110.

Refer to FIGS. 1C~1D. The light source module 150 includes a light source 152, a light guide plate 160, and an optical film 170. The light source module 150 and the metal frame 120 form a backlight module. The light source 152 is located on a side of the light guide plate 160. The optical film 170 lies between the light guide plate 160 and the LCD panel 110. The resin frame 130 and the metal frame 120 provide a chamber structure for the LCD panel 110 and the light source module 150 to be put therein.

Specifically, a side of the metal frame 120 is bent to form a bearing structure 124. The bearing structure 124 accommodates the light source 152, serves as a reflective cover, and clamps the light guide plate 160. The bearing structure 124 can reflect light to the light guide plate 160 to enhance the efficiency of light utility and decrease light leakage.

Herein, the light source 152 of the LCD apparatus 100 is structured as a light emitting diode (LED) light bar. To assemble the light source 152, a side of a reflective tape is adhered to the LED light bar first. Then, another side of the reflective tape is adhered to the bearing structure 124 of the metal frame 120.

However, it can be seen from FIG. 1C that the bearing structure 124 approximately has a U-shape. In addition, the light source 152 is relatively thin; the corresponding U-shape opening of the bearing structure 124 is relatively small. These characteristics make it difficult to fasten the light source 152 and to confirm that all the parts are properly positioned when assembling the light source 152. Particularly, it's difficult to adjust the position of the light guide plate 160 during the assembly process. As a result, the manufacturing efficiency and yield rate are relatively low.

Accordingly, to alleviate the difficulty in the assembly process and resolve the positioning hardship, the industry of backlight module needs a proper design for the metal frame and the reflective structure of the light source.

SUMMARY OF THE INVENTION

Accordingly, the invention is directed to a clamping device having a two-part design.

The invention is further directed to a backlight module and a display apparatus that utilize the above clamping device to enhance the assembly efficiency and increase the yield rate.

The invention provides a clamping device. The clamping device includes a back frame and a top cover. The back frame includes a first body and a first sidewall. The first sidewall is connected to the first body in a substantially vertical manner. The top cover includes a second body and a second sidewall. The second sidewall is connected to the second body in a substantially vertical manner. When the top cover and the back frame are assembled, the second sidewall leans closely against the first sidewall and the first body is opposite to the second body. The second body includes a main part and a concave part connected to the main part. The distance from the concave part to the first body is shorter than the distance from the main part to the first body.

According to an embodiment of the invention, the back frame further includes an extension part. A portion of the extension part is connected to a portion of the first sidewall in a substantially vertical manner. The extension part is substantially parallel to the first body. The extension part, the portion of the first sidewall, and a portion of the first body form a bent structure.

According to an embodiment of the invention, the length of the second sidewall is shorter than the length of the second body so that the second sidewall is connected to a portion of the second body.

According to an embodiment of the invention, the back frame further includes a first fixing structure connected to the first sidewall. The first fixing structure and the first body are located on two opposite sides of the first sidewall.

According to an embodiment of the invention, the top cover further includes a second fixing structure connected to the main part of the second body. When the top cover and the back frame are assembled, the second fixing structure leans closely against the first fixing structure.

According to an embodiment of the invention, the first fixing structure and the second fixing structure are fastened together by a screw or a rivet.

According to an embodiment of the invention, the top cover further includes a fixing structure connected to the main part of the second body. When the top cover and the back frame are assembled, the first sidewall substantially leans against the fixing structure.

The invention provides a backlight module. The backlight module includes a substrate, a light source, and the aforementioned clamping device. The substrate includes a light-inlet surface, a light-outlet surface, and a bottom surface. The light-outlet surface is opposite to the bottom surface. The light-inlet surface is connected between the light-outlet surface and the bottom surface. The light source is disposed adjacent to the light-inlet surface of the substrate. The substrate is located on the first body of the back frame of the clamping device. The light source lies between the first sidewall of the back frame of the clamping device and the substrate. When the clamping device, the substrate, and the light source are assembled, the concave part of the top cover of the clamping device leans closely against the light-outlet surface of the substrate, and the light source is located within a space encircled by the top cover, the substrate, and the back frame.

According to an embodiment of the invention, the first sidewall further includes an extension part. The extension part is connected to a portion of the first sidewall in a substantially vertical manner. The extension part is substantially parallel to the first body. The extension part, the portion of the first sidewall, and a portion of the first body form a bent structure.

According to an embodiment of the invention, the back frame further includes a first fixing structure connected to the first sidewall. The first fixing structure and the first body are located on two opposite sides of the first sidewall.

According to an embodiment of the invention, the top cover further includes a second fixing structure connected to the main part of the second body. When the top cover and the back frame are assembled, the second fixing structure leans closely against the first fixing structure.

According to an embodiment of the invention, the first fixing structure and the second fixing structure are fastened together by a screw or a rivet.

According to an embodiment of the invention, the top cover further includes a fixing structure connected to the main part of the second body. When the top cover and the back frame are assembled, the first sidewall substantially leans against the fixing structure.

According to an embodiment of the invention, the light source is a light emitting diode (LED) light bar.

According to an embodiment of the invention, the substrate is a light guide plate or a diffusion plate.

According to an embodiment of the invention, the backlight module further includes at least one optical film located above the light-outlet surface. The backlight module further includes a resin frame located between the back frame of the clamping device and the optical film. The resin frame fixes the substrate and the optical film.

The invention further provides a display apparatus. The display apparatus includes a display panel, a circuit board, and the aforementioned backlight module. The display panel is located on the light-outlet surface. The circuit board is adjacent to the second body and is electrically connected to the display panel. The clamping device lies between the circuit board and the display panel.

According to an embodiment of the invention, the back frame further includes a first fixing structure connected to the first sidewall. The first fixing structure and the first body are located on two opposite sides of the first sidewall.

According to an embodiment of the invention, the circuit board is fastened to the first fixing structure.

According to an embodiment of the invention, the top cover further includes a second fixing structure connected to the main part of the second body. When the top cover and the back frame are assembled, the second fixing structure leans closely against the first fixing structure.

According to an embodiment of the invention, the circuit board is fastened to the first fixing structure and the second fixing structure.

According to an embodiment of the invention, the top cover further includes a fixing structure connected to the main part of the second body. When the top cover and the back frame are assembled, the first sidewall substantially leans against the fixing structure.

According to an embodiment of the invention, the circuit board is fastened to the fixing structure.

The clamping device of the invention has a two-part design. The two-part design can alleviate the difficulties of assembly and positioning throughout the manufacturing process. The invention further provides a backlight module and a display apparatus that utilize the aforementioned clamping device to enhance the manufacturing efficiency and increase the yield rate.

In order to the make the aforementioned and other features and advantages of the invention comprehensible, embodiments accompanied with figures are described in detail below.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1A:
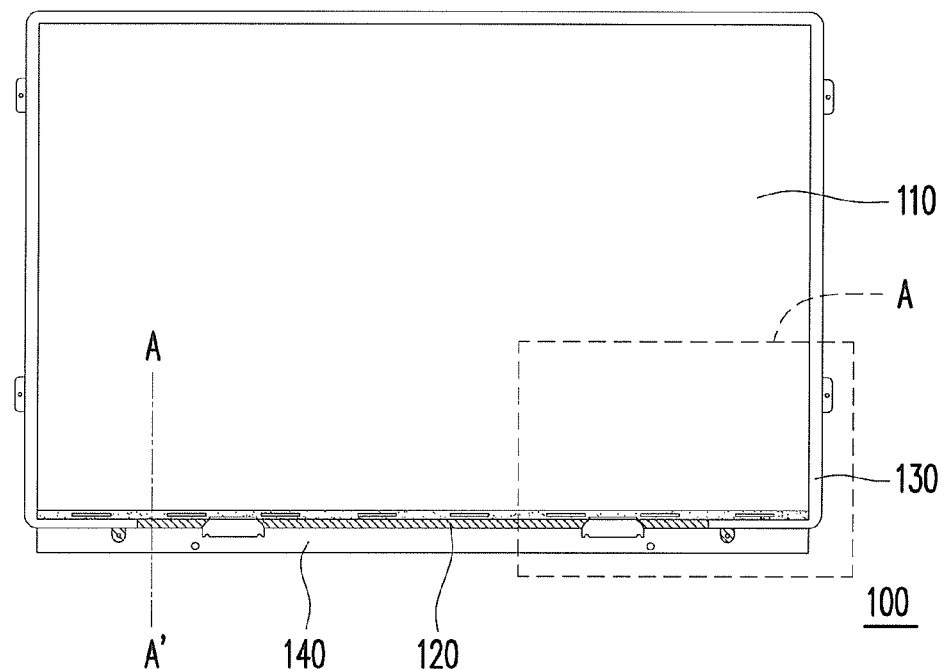
FIG. 1A is a top view diagram of a conventional LCD apparatus using a side-type backlight module.
Figure 1B:
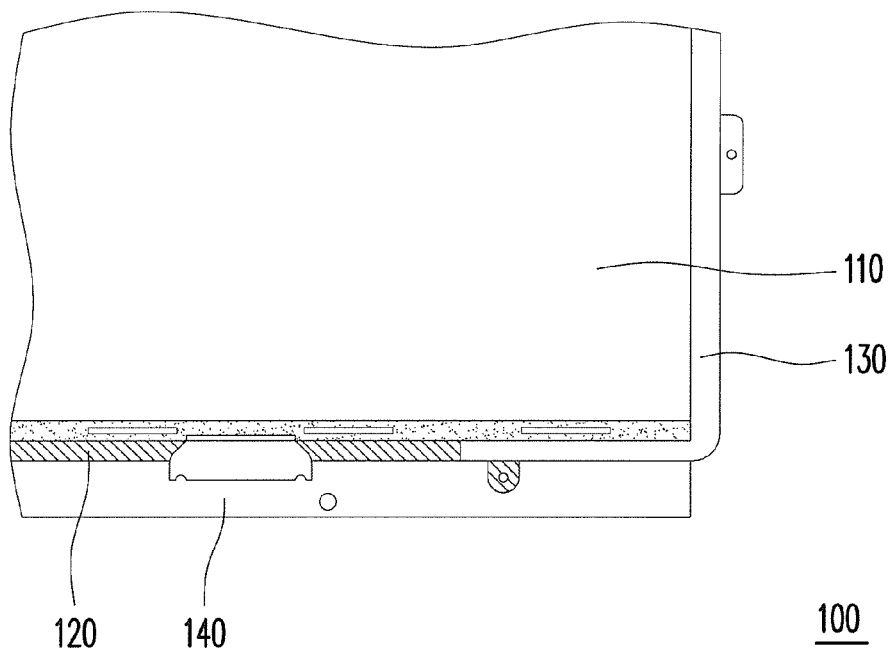
FIG. 1B is a schematic diagram showing the enlarged area A of FIG. 1A.
Figure 1C:
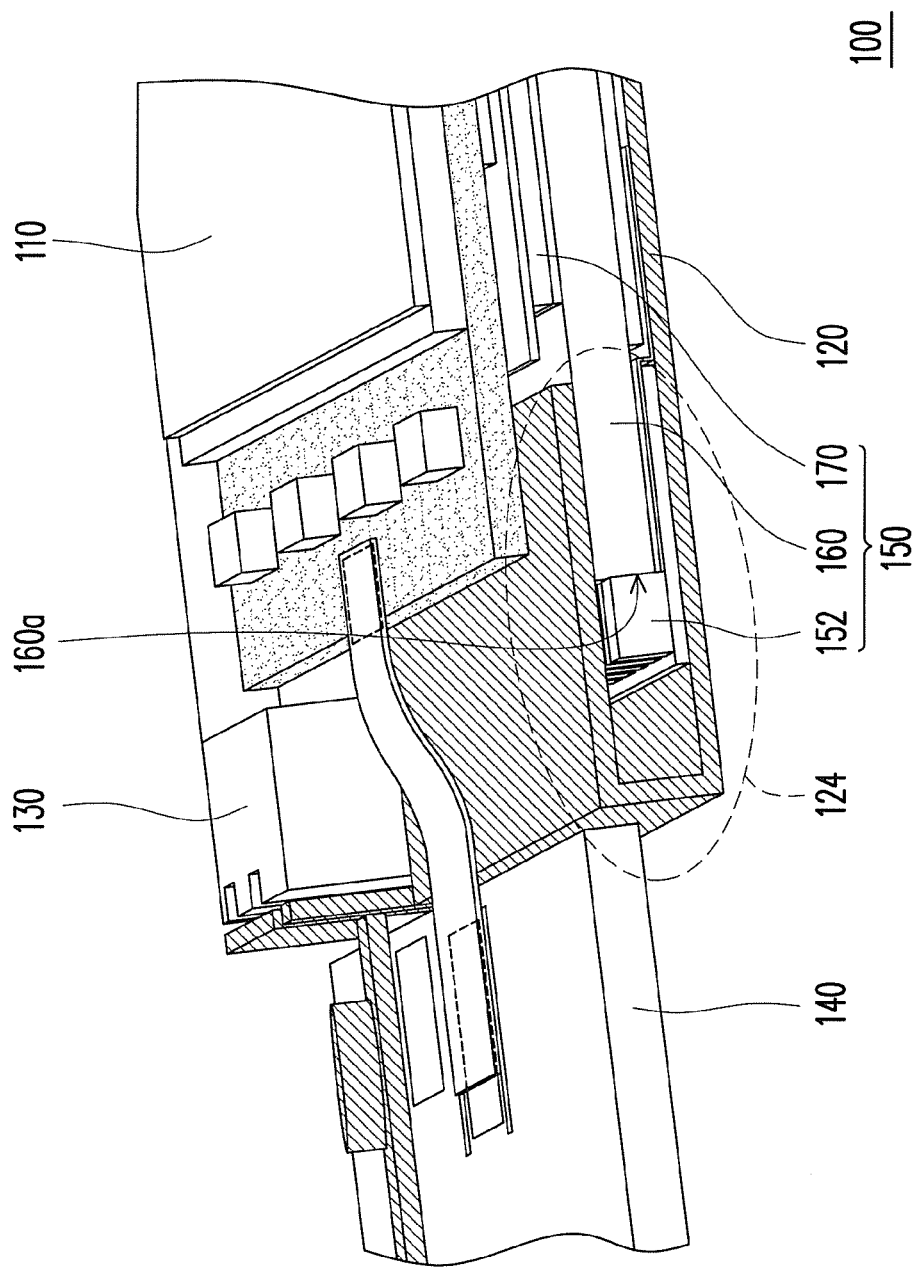
FIG. 1C is a 3-dimensional diagram showing the cross-section along the A-A' direction of FIG. 1A.
Figure 1D:
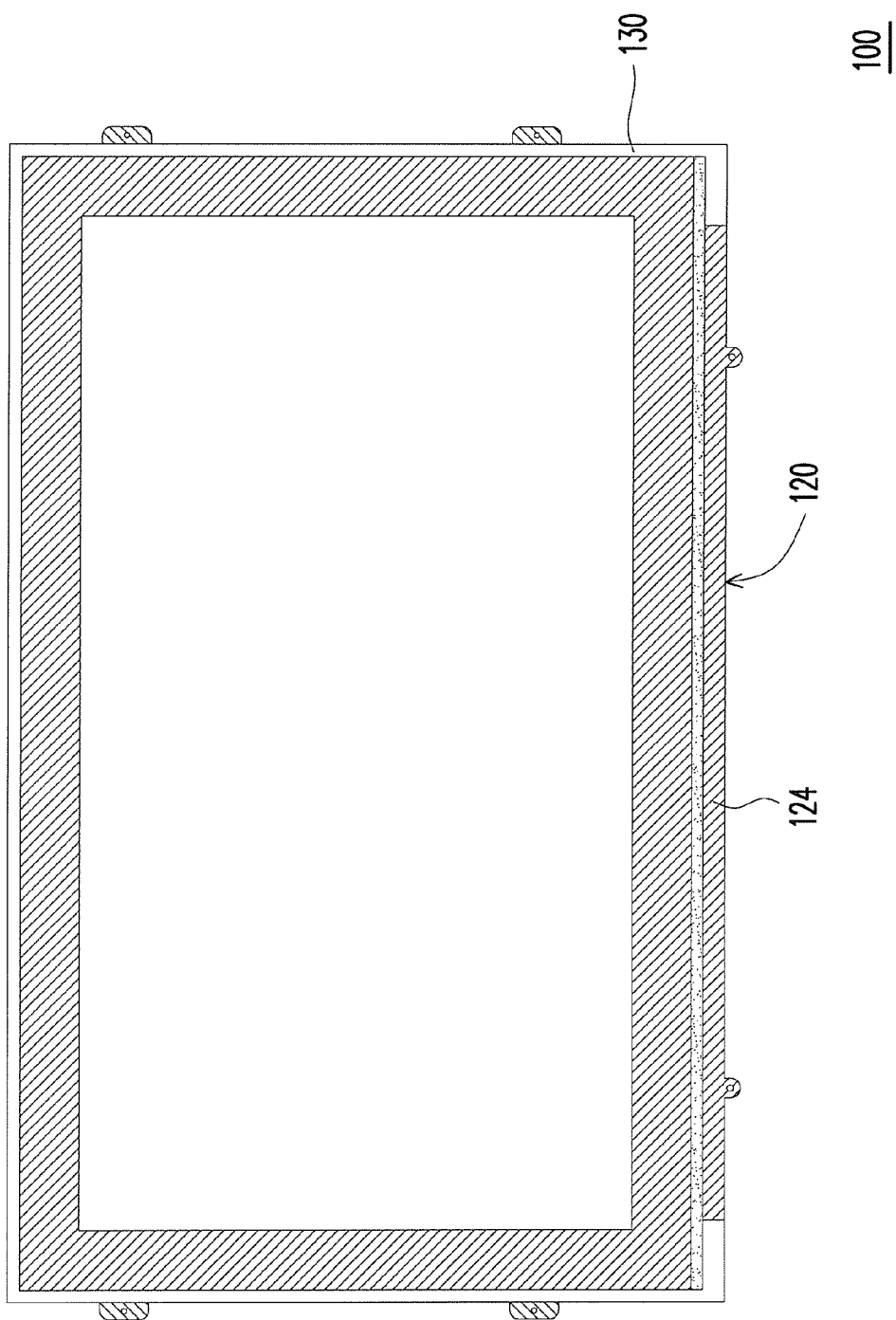
FIG. 1D is a top view diagram of the metal frame of the backlight module of FIG. 1A.
Figure 2A:
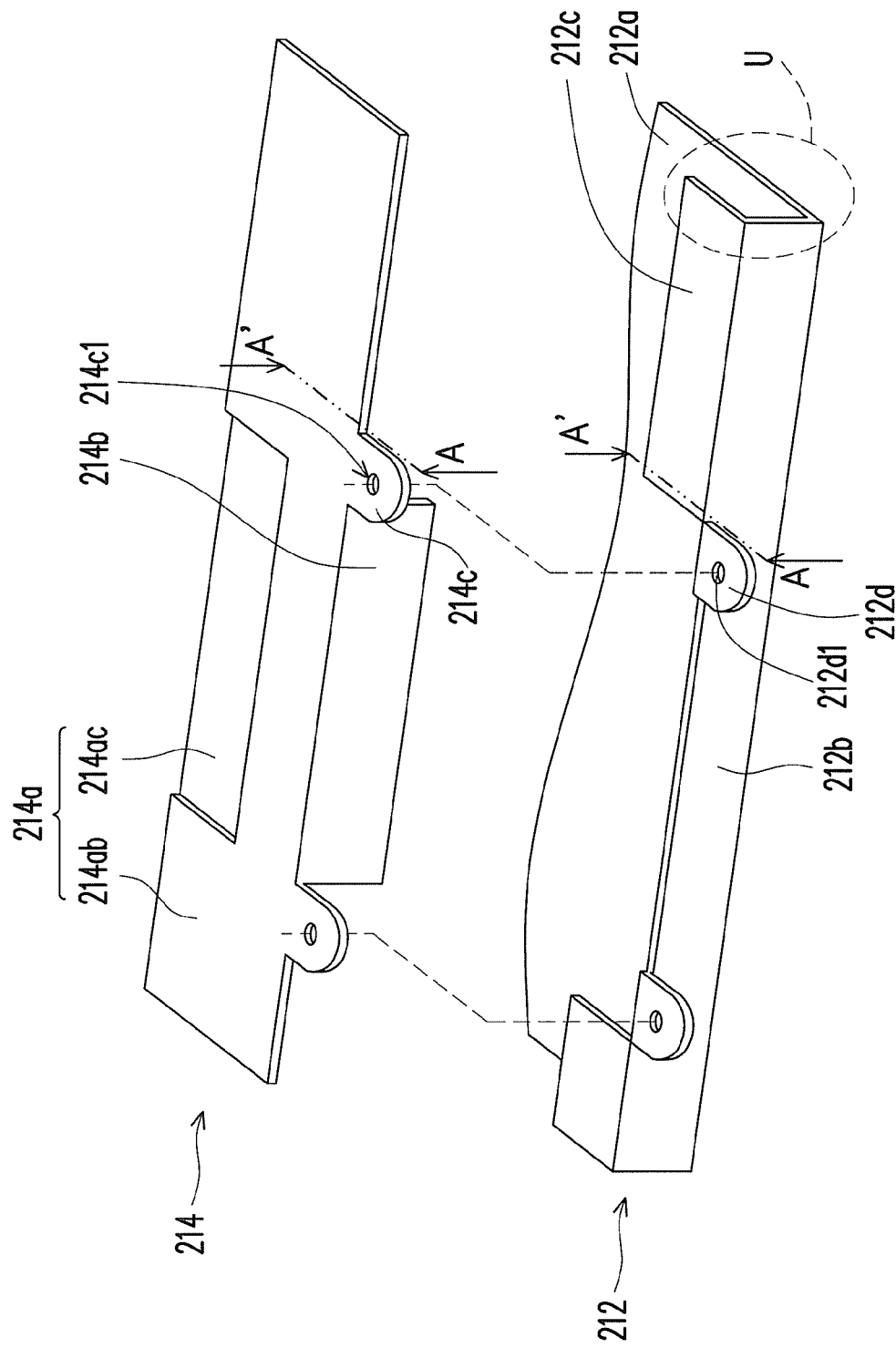
FIG. 2A is a partial explosion diagram of a clamping device according to an embodiment of the invention.
Figure 2B:
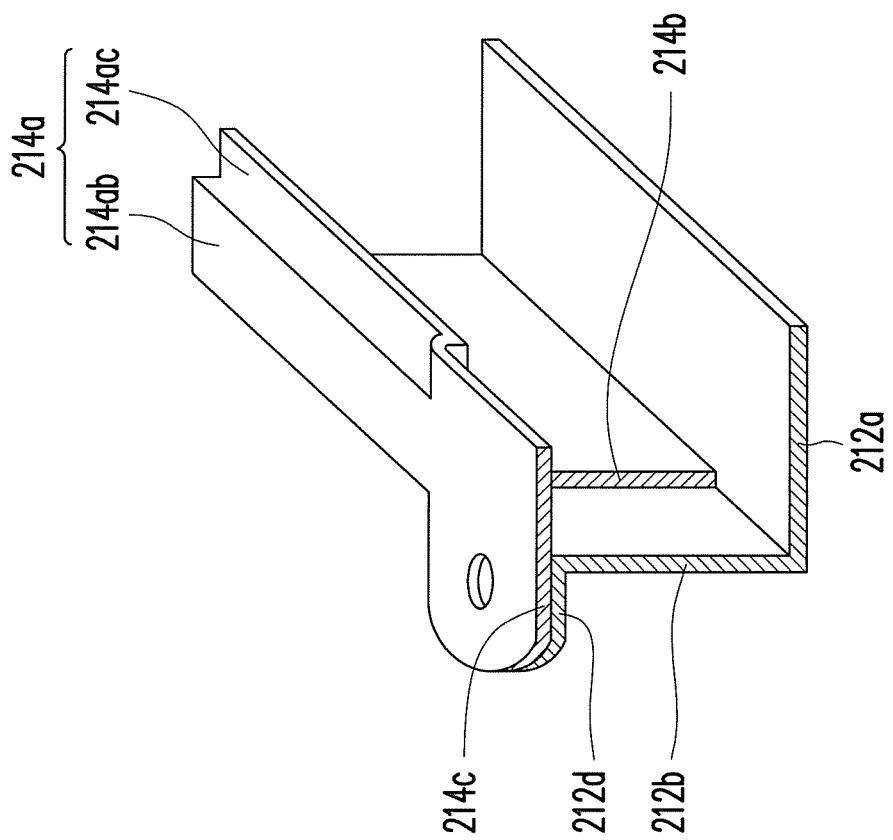
FIG. 2B is a partial schematic diagram of the clamping device of FIG. 2A after assembly.

FIG. 2A is a partial explosion diagram of a clamping device according to an embodiment of the invention. FIG. 2B is a partial schematic diagram of the clamping device of FIG. 2A after assembly. Refer to FIG. 2A first. The clamping device 210 includes a back frame 212 and a top cover 214. The back frame 212 includes a first body 212a and a first sidewall 212b. The first sidewall 212b is connected to the first body 212a in a substantially vertical manner. In the present embodiment, the first sidewall 212b and the first body 212a are interconnected and form an L-shape corner. In addition, in the present embodiment, the first sidewall 212b and the first body 212a are an all-in-one part manufactured through metal stamping. The L-shape corner in the present embodiment has a right angle. However, the angle of the L-shape corner can be altered according to different design requirements.

The top cover 214 includes a second body 214a and a second sidewall 214b. The second sidewall 214b is connected to the second body 214a in a substantially vertical manner. In the present embodiment, the second sidewall 214b and the second body 214a are interconnected and form an L-shape corner. In addition, in the present embodiment, the second sidewall 214b and the second body 214a are an all-in-one part manufactured through metal stamping. The L-shape corner in the present embodiment has a right angle. However, the angle of the L-shape corner can be altered according to different design requirements.

The second sidewall 214b does not have a specific length requirement. In the present embodiment, the length of the second sidewall 214b is shorter than the length of the second body 214a, so that the second sidewall 214b is connected to only a portion of the second body 214a. In other words, only a portion of the second body 214a is connected to the second sidewall 214b. In another embodiment, the length of the second sidewall 214b can be equal to the length of the second body 214a. In other words, a side of the second body 214a may be entirely connected to the second sidewall 214b. In addition, the second body 214a further includes a main part 214ab and a concave part 214ac connected together.

Refer to FIG. 2B. After the top cover 214 and the back frame 212 are assembled, the second sidewall 214b leans closely against the first sidewall 212b, the first body 212a is opposite to the second body 214a, and the distance from the concave part 214ac to the first body 212a is shorter than the distance from the main part 214ab to the first body 212a. Specifically, through leaning the second sidewall 214b and the first sidewall 212b closely against each other, an assembler can assemble the top cover 214 and the back frame 212 to clamp an object. In addition, the distance from the concave part 214ac to the first body 212a is shorter than the distance from the main part 214ab to the first body 212a. As a result, as long as the object to be clamped is placed between the concave part 214ac and the first body 212a, the embodiment can further enhance the clamping and fastening effect.

How the second sidewall 214b contacts the first sidewall 212b does not constitute a necessary limitation of the invention. For example, the second sidewall 214b can simply lean against the first sidewall 212b, just like the present embodiment. The second sidewall 214b can also be fastened to the first sidewall 212b through either some adhesive or a joint mechanism.

Refer to FIGS. 2A and 2B. In the present embodiment, the back frame 212 further includes a first fixing structure 212d, which is connected to the first sidewall 212b. The first fixing structure 212d and the first body 212a are located on two opposite sides of the first sidewall 212b. In addition, the top cover 214 further includes a second fixing structure 214c, which is connected to the main part 214ab of the second body 214a.

When the top cover 214 and the back frame 212 are assembled, the second fixing structure 214c leans closely against the first fixing structure 212d. It is noted that how the second fixing structure 214c contacts the first fixing structure 212d does not constitute a necessary limitation of the invention. For example, in the present embodiment the first fixing structure 212d further includes a first hollow part 212d1, and the second fixing structure 214c further includes a second hollow part 214c1. The first hollow part 212d1 and the second hollow part 214c1 can be fasten together by either a screw or a rivet or other means for physical fastening.

In the present embodiment, the clamping device 210 has a two-part design. For the clamping device 210 to clamp and hold an object, the object is first placed on the first body 212a of the back frame 212. Then, the top cover 214 and the back frame 212 are assembled to clamp and hold the object. In this assembly process, the object is not shielded by any structure from the assembler's eyesight. Hence, the object can be placed in the correct position easily. Therefore, the design of the clamping device 210 makes the assembly process easier and the positioning more precise.

The back frame 212 of the present embodiment further includes an extension part 212c. The extension part 212c is connected to a portion of the first sidewall 212b in a substantially vertical manner. The extension part 212c and the first body 212a are opposite to and substantially parallel to each other. In addition, the extension part 212c, a portion of the first sidewall 212b, and a portion of the first body 212a form a bent structure U. Although there are two extension parts 212c in the present embodiment, the number of the extension parts 212c is not a necessary limitation of the present. In other embodiments, the back frame 212 can have no extension part 212c at all.

In the present embodiment, only a small portion of the first sidewall 212b is connected with the extension part 212c. Therefore, when the object to be clamped and held is placed on the back frame 212, the extension part 212c does not shield the object from the assembler's eyesight. Accordingly, the object can be placed on the precise position easily.

By introducing a display apparatus incorporating the clamping device 210, the following embodiment further illustrates the structure of the top cover 214 and the back frame 212 assembled together.

Figure 3A:
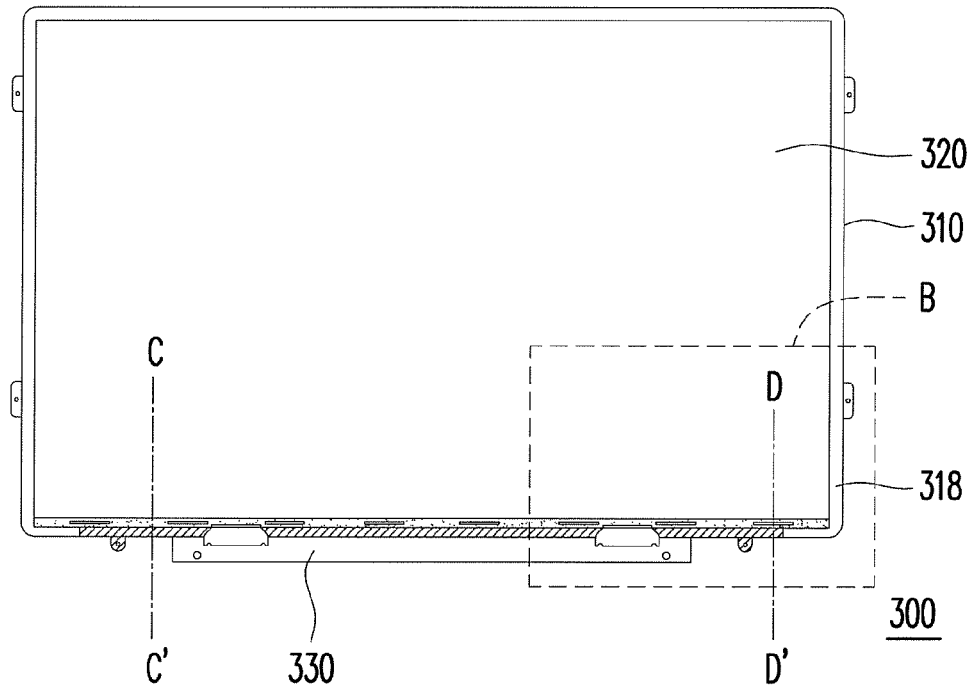
FIG. 3A is a top view diagram of a display apparatus using an LED as the light source of the side-type backlight module in the display apparatus according to an embodiment of the invention.
Figure 3B:
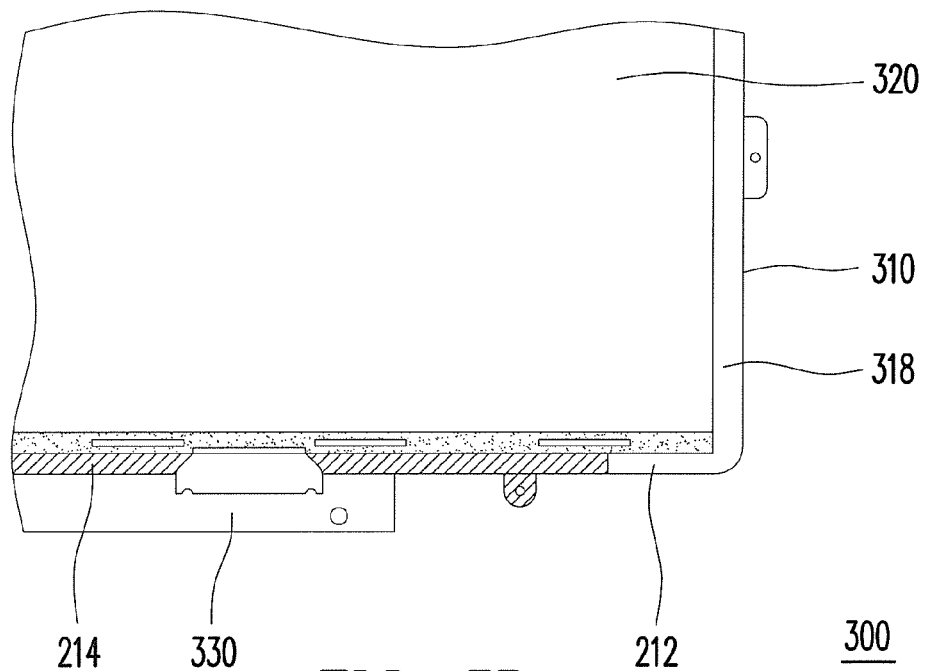
FIG. 3B is a schematic diagram showing the enlarged area B of FIG. 3A.
Figure 3C:
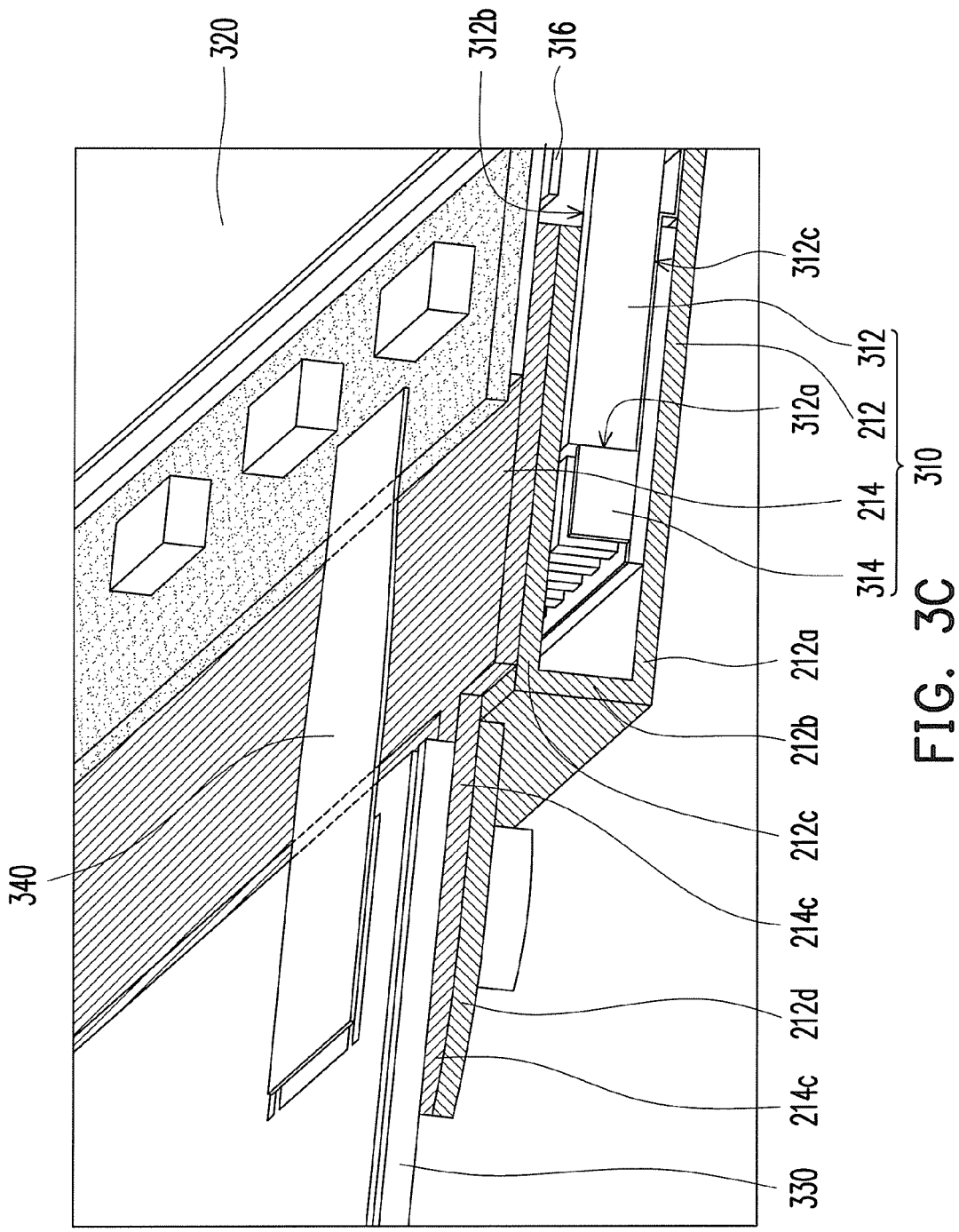
FIGS. 3C and 3D are 3-dimensional diagrams showing the cross-sections along the C-C' and D-D' directions of FIG. 3A, respectively.
Figure 3D:
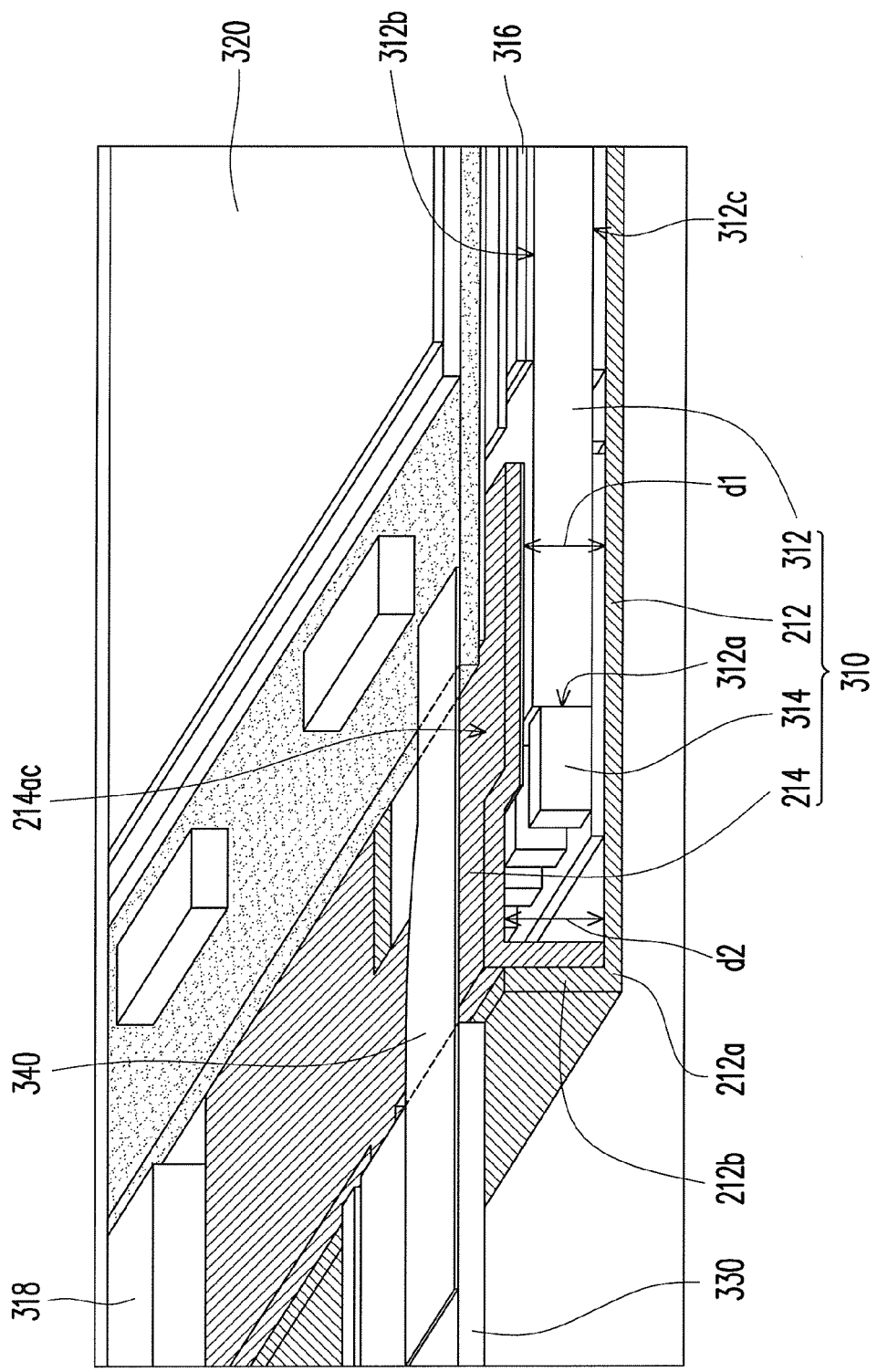

FIG. 3A is a top view diagram of a display apparatus using an LED as the light source of the side-type backlight module in the LCD apparatus according to an embodiment of the invention. FIG. 3B is a schematic diagram showing the enlarged area B of FIG. 3A. FIGS. 3C and 3D are 3-dimensional diagrams showing the cross-sections along the C-C' and D-D' directions of FIG. 3A, respectively. Refer to FIGS. 3A and 3B first. The display apparatus 300 includes a backlight module 310, a display panel 320, and a circuit board 330.

Refer to FIGS. 3C and 3D. The backlight module 310 includes a clamping device, a substrate 312, and a light source 314. The clamping device in the present embodiment is the same as the clamping device 210 mentioned in FIG. 2B. The substrate 312 includes a light-inlet surface 312a, a light-outlet surface 312b, and a bottom surface 312c. The light-outlet surface 312b is opposite to the bottom surface 312c. The light-inlet surface 312a is connected between the light-outlet surface 312b and the bottom surface 312c. In other words, the backlight module 310 is a backlight module having a lateral light inlet. In the present embodiment, the substrate 312 is a light guide plate. In another embodiment, the substrate 312 can be a diffusion plate.

The light source 314 is adjacent to the light-inlet surface 312a of the substrate 312. The substrate 312 is located on the first body 212a of the back frame 212 of the clamping device. The light source 314 lies between the first sidewall 212b of the back frame 212 of the clamping device and the substrate 312. When the clamping device, the substrate 312, and the light source 314 are assembled, the concave part 214ac of the top cover 214 of the clamping device leans closely against the light-outlet surface 312b of the substrate 312. Furthermore, the light source 314 is located within a space encircled by the top cover 214, the substrate 312, and the back frame 212. In the present embodiment, the light source 314 is, for example, an LED light bar.

Refer to FIGS. 3C and 3D. The display panel 320 is located on the light-outlet surface 312b of the substrate 312. The circuit board 330 is disposed adjacent to the second body 214a of the top cover 214 and is electrically connected to the display panel 320. The clamping device 210 lies between the circuit board 330 and the display panel 320. Specifically, the circuit board 330 is electrically connected to the display panel 320 through a flexible printed circuit board (FPC) 340.

In the present embodiment, the backlight module 310 further includes at least one optical film 316 located above the light-outlet surface 312b. For example, the optical film 316 can be a light-enhancing film, a light-diffusion film, a compound film, or a combination thereof, used to enhance the light output effects of the backlight module 310. In addition, the backlight module 310 of the present embodiment further includes a resin frame 318. The resin frame 318 lies between the back frame 212 of the clamping device 210 and the optical film 316. The resin frame 318 fixes the substrate 312 and the optical film 316.

Similar to the previous embodiment, through leaning the second sidewall 214b and the first sidewall 212b closely against each other, an assembler can assemble the top cover 214 and the back frame 212 to clamp an object. The substrate 312 serves as an example of the object to be clamped. In additional, through leaning the second sidewall 214b and first sidewall 212b closely against each other, the present embodiment alleviates the light-leakage effect that might be caused by the aforementioned two-part design. Because the distance d1 from the concave part 214ac to the first body 212a is shorter than the distance d2 from the main part 214ab to the first body 212a, the substrate 312 placed between the concave part 214ac and the first body 212a is further clamped and fastened.

How the second sidewall 214b contacts the first sidewall 212b does not constitute a necessary limitation of the invention. For example, the second sidewall 214b can simply lean against the first sidewall 212b, just like the present embodiment. The second sidewall 214b can also be fastened to the first sidewall 212b through either some adhesive or a joint mechanism.

In addition, the back frame 212 of the present embodiment further includes a first fixing structure 212d connected to the first sidewall 212b. The top cover 214 further includes a second fixing structure 214c. As shown in FIG. 3C, the circuit board 330 of the present embodiment is fastened to the first fixing structure 212d and the second fixing structure 214c. Through fastening the first fixing structure 212d of the back frame 212 with the second fixing structure 214c of the top cover 214, the clamping device 210, the substrate 312, the light source 314, and the circuit board 330 can be properly fixed.

How the first fixing structure 212d, the second fixing structure 214c, and the circuit board 330 are fastened together does not constitute a necessary limitation of the invention. For example, the first fixing structure 212d, the second fixing structure 214c, and the circuit board 330 can be fastened together by screws, rivets, or other joint mechanisms.

In another embodiment, the back frame does not include a fixing structure. That is to say, only the top cover has a fixing structure, which is not shown in the figures. When the top cover and the back frame are assembled, the first sidewall substantially leans against the fixing structure of the top cover, and the circuit board is fastened to the fixing structure.

In addition, the back frame 212 of the present embodiment further includes an extension part 212c. The extension part 212c is connected to a portion of the first sidewall 212b in a substantially vertical manner. The extension part 212c is opposite to the first body 212a. Furthermore, only a small portion of the first sidewall 212b is connected to the extension part 212c. When the top cover 214 and the back frame 212 are assembled for clamping, the existence of the extension part 212c does not have negative effect on the visibility of the clamped object.

For example, to assemble the backlight module 310, the light source 314 is first disposed on the back frame 212. Next, the substrate 312 is disposed beside the light source 314. Then, the top cover 214 and the back frame 212 are assembled. In the clamping device 210, which has a two-part clamping structure, the back frame 212 provides an open area for the assembly of the light source 314 and the substrate 312. The open area makes the assembly process easier. Specifically, during the assembly process, the assembler can easily observe whether the position of the light source 314 is accurate. Therefore, the manufacturing efficiency is enhanced and the yield rate is increased.

The two-part structure of the clamping device is suitable for fastening objects such as the aforementioned light guide plate. Furthermore, the invention provides a backlight module and a display apparatus that utilize the aforementioned clamping device. Because the invention alleviates the positioning difficulties during the assembly process, the manufacturing efficiency is enhanced, the yield rate is increased, and the manufacturing costs are reduced.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. A clamping device, comprising:
    a back frame, comprising an extension part, a first body and a first sidewall, the first sidewall being connected to the first body in a substantially vertical manner, the extension part being connected to a portion of the first sidewall in a substantially vertical manner, the extension part being substantially parallel to the first body, wherein the extension part, the portion of the first sidewall, and a portion of the first body form a bent structure; and
    a top cover, comprising a second body and a second sidewall, the second sidewall being connected to the second body in a substantially vertical manner, when the top cover and the back frame are assembled, the second sidewall leans closely against the first sidewall, and the first body is opposite to the second body;
    wherein the second body comprises a main part and a concave part connected to the main part, and a distance from the concave part to the first body is shorter than a distance from the main part to the first body, and
    wherein the concave part is spaced from the back frame to form an accommodating space for clamping an object.

2. The clamping device of claim 1, wherein the length of the second sidewall is shorter than the length of the second body so that the second sidewall is connected to a portion of the second body.

3. The clamping device of claim 1, wherein the back frame further comprises a first fixing structure connected to the first sidewall, and the first fixing structure and the first body are located on two opposite sides of the first sidewall.

4. The clamping device of claim 3, wherein the top cover further comprises a second fixing structure connected to the main part of the second body, and when the top cover and the back frame are assembled, the second fixing structure leans closely against the first fixing structure.

5. The clamping device of claim 4, wherein the first fixing structure and the second fixing structure are fastened together by a screw or a rivet.

6. The clamping device of claim 1, wherein the top cover further comprises a fixing structure connected to the main part of the second body, when the top cover and the back frame are assembled, the first sidewall substantially leans against the fixing structure.

7. A backlight module, comprising:
a substrate, comprising a light-inlet surface, a light-outlet surface, and a bottom surface, the light-outlet surface being opposite to the bottom surface, the light-inlet surface being connected between the light-outlet surface and the bottom surface;
a light source disposed adjacent to the light-inlet surface of the substrate; and
the clamping device of claim 1,
wherein the substrate is located above the first body, the light source lies between the first sidewall and the substrate, when the clamping device, the substrate, and the light source are assembled, the concave part leans closely against the light-outlet surface of the substrate, and the light source is located within a space encircled by the top cover, the substrate, and the back frame.

8. The backlight module of claim 7, wherein the first sidewall further comprises an extension part, the extension part is connected to a portion of the first sidewall in a substantially vertical manner, the extension part is substantially parallel to the first body, the extension part, the portion of the first sidewall, and a portion of the first body form a bent structure.

9. The backlight module of claim 7, wherein the length of the second sidewall is shorter than the length of the second body so that the second sidewall is connected to a portion of the second body.

10. The backlight module of claim 7, wherein the back frame further comprises a first fixing structure connected to the first sidewall, the first fixing structure and the first body are located on two opposite sides of the first sidewall.

11. The backlight module of claim 10, wherein the top cover further comprises a second fixing structure connected to the main part of the second body, when the top cover and the back frame are assembled, the second fixing structure leans closely against the first fixing structure.

12. The backlight module of claim 11, wherein the first fixing structure and the second fixing structure are fastened together by a screw or a rivet.

13. The backlight module of claim 7, wherein the top cover further comprises a fixing structure connected to the main part of the second body, when the top cover and the back frame are assembled, the first sidewall substantially leans against the fixing structure.

14. The backlight module of claim 7, wherein the light source is a light emitting diode (LED) light bar.

15. The backlight module of claim 7, wherein the substrate is a light guide plate or a diffusion plate.

16. The backlight module of claim 7, further comprising at least one optical film located above the light-outlet surface.

17. The backlight module of claim 16, further comprising a resin frame located between the back frame of the clamping device and the optical film so as to fix the substrate and the optical film.

18. A display apparatus, comprising:
the backlight module of claim 7;
a display panel located on the light-outlet surface; and
a circuit board located beside the second body and electrically connected to the display panel, the clamping device being located between the circuit board and the display panel.

19. The display apparatus of claim 18, wherein the back frame further comprises a first fixing structure connected to the first sidewall, the first fixing structure and the first body are located on two opposite sides of the first sidewall.

20. The display apparatus of claim 19, wherein the circuit board is fastened to the first fixing structure.

21. The display apparatus of claim 19, wherein the top cover further comprises a second fixing structure connected to the main part of the second body, when the top cover and the back frame are assembled, the second fixing structure leans closely against the first fixing structure.

22. The display apparatus of claim 21, wherein the circuit board is fastened to the first fixing structure and the second fixing structure.

23. The display apparatus of claim 18, wherein the top cover further comprises a fixing structure connected to the main part of the second body, when the top cover and the back frame are assembled, the first sidewall substantially leans against the fixing structure.

24. The display apparatus of claim 23, wherein the circuit board is fastened to the fixing structure.

* * * * *